United States Patent
Brooke

(10) Patent No.: US 9,164,292 B2
(45) Date of Patent: Oct. 20, 2015

(54) TRACK AND BOGIE BASED OPTICALLY CENTERED GIMBAL

(71) Applicant: Ian Brooke, Sebastopol, CA (US)

(72) Inventor: Ian Brooke, Sebastopol, CA (US)

( * ) Notice: Subject to any disclaimer, the term of this patent is extended or adjusted under 35 U.S.C. 154(b) by 0 days.

(21) Appl. No.: 14/304,929

(22) Filed: Jun. 14, 2014

(65) Prior Publication Data

US 2015/0078738 A1  Mar. 19, 2015

Related U.S. Application Data

(60) Provisional application No. 61/835,481, filed on Jun. 14, 2013.

(51) Int. Cl.
*G03B 17/00* (2006.01)
*G02B 27/64* (2006.01)
*G03B 17/56* (2006.01)

(52) U.S. Cl.
CPC ............ *G02B 27/648* (2013.01); *G03B 17/561* (2013.01); *G03B 2205/0069* (2013.01); *G03B 2217/005* (2013.01)

(58) Field of Classification Search
USPC ........................................................... 396/53
See application file for complete search history.

(56) References Cited

U.S. PATENT DOCUMENTS

| 5,262,815 | A | * | 11/1993 | Aumiller ............................ 396/2 |
| 5,368,271 | A | | 11/1994 | Kiunke et al. |
| 5,502,598 | A | * | 3/1996 | Kimura et al. ................. 359/814 |
| 2006/0071134 | A1 | | 4/2006 | Dent et al. |
| 2007/0127912 | A1 | | 6/2007 | Jones et al. |
| 2008/0012980 | A1 | | 1/2008 | Yamane et al. |
| 2012/0072099 | A1 | | 3/2012 | Ahlstedt et al. |

OTHER PUBLICATIONS

International Search Report and Written Opinion for Serial No. PCT/US2014/042441 mailed Dec. 10, 2014.

* cited by examiner

*Primary Examiner* — Clayton E Laballe
*Assistant Examiner* — Dennis Hancock
(74) *Attorney, Agent, or Firm* — Brooks Acordia IP Law, PC; Pejman Yedidsion; Christopher Weiss

(57) ABSTRACT

Systems, devices, and methods for image stabilization, more particularly, a track and bogie based optically centered gimbal stabilizing assembly comprising: a ring having an inwardly disposed track (110); a first bogie (130) having an arcuate first chassis member, a first wheel assembly, and a second wheel assembly; a second bogie (120) having an arcuate second chassis member, a third wheel assembly, and a fourth wheel assembly; where the first wheel assembly, the second wheel assembly, the third wheel assembly, and the fourth wheel assembly may each ride in the track (110); and a tilt plate (170) operatively connected to the first bogie (130) and the second bogie (120) and movable therewith.

14 Claims, 12 Drawing Sheets

601

TRACK AND BOGIE BASED OPTICALLY CENTERED GIMBAL

CROSS-REFERENCE TO RELATED APPLICATIONS

This application claims priority to and the benefit of Provisional Patent Application No. 61/835,481 filed Jun. 14, 2013, the contents of which is hereby incorporated by reference herein in its entirety and for all purposes.

BACKGROUND

Image stabilization equipment may be used to provide pivoted support to allow the rotation of an object, such as a portable image capture device, about an axis. In applications that require portable photography equipment components, such as an imager, single-axis gimbal heads may be used in order to allow a balanced movement for the camera and lenses. Typically, gimbal assemblies do not allow the image capture device to move freely, i.e., have non-versatile applicability. Current gimbal assemblies are also not optically optimized, have low rigidity, are of non-scalable low production quantities, come at a high price, and do not provide any specific image capture device solutions.

SUMMARY

Embodiments may include a stabilizing assembly comprising: a ring having an inwardly disposed track; a first bogie having an arcuate first chassis member, a first wheel assembly, and a second wheel assembly; a second bogie having an arcuate second chassis member, a third wheel assembly, and a fourth wheel assembly; where the first wheel assembly, the second wheel assembly, the third wheel assembly, and the fourth wheel assembly each riding in the track; and a tilt plate operatively connected to the first and second bogies and movable therewith. Optionally, the tilt plate may be configured to operatively hold a camera optically centered relative to the ring and a user specified plane. The assembly may further comprise position sensors and a controller configured to receive information from the sensors and to cause stabilization action of the tilt plate to occur in response to the information. The assembly may further comprise a roll motor connected to one of the bogies and a tilt motor connected to the tilt plate, and the controller controlling operation of the roll motor and the tilt motor. In another embodiment, the ring, the bogies and the tilt plate may define a gimbal assembly to stabilize a camera held by the assembly as the assembly moves in roll and pitch directions. Optionally, the gimbal assembly may stabilize the camera in the yaw direction.

Other embodiments may include an assembly comprising: a track; a first bogie having an arcuate first chassis member, a first wheel assembly, and a second wheel assembly, where the first wheel assembly and the second wheel assembly each comprise one or more wheels and the one or more wheels ride on an inside of the track and are offset inwards from the track; and a second bogie having an arcuate second chassis member, a third wheel assembly, and a fourth wheel assembly, where the third wheel assembly and the fourth wheel assembly each comprise one or more wheels and the one or more wheels ride on the inside of the track and are offset inwards from the track; where the first bogie and the second bogie may travel about a roll axis relative to the track. Optionally, the assembly may further comprise: a first motor mounted on an inner surface of the arcuate first chassis member; a tilt plate connected to the first bogie and the second bogie via a set of pivot points, where the tilt plate travels about a pitch axis relative to the track; a second motor connected to the tilt plate; and a camera connected to the tilt plate; where the first motor adjusts movement of the camera about the roll axis relative to the track, and the second motor adjusts movement of the camera about a pitch axis relative to the track. The assembly may further comprise: a third motor connected to the assembly, where the third motor adjusts movement of the camera about a yaw axis relative to the track.

Optionally, the center of mass may be coincident with an optical axis of the camera within a relative plane of movement. The track may be inwardly disposed on a ring and the track may be tapered. In one embodiment, the first bogie and the second bogie may each span about one quarter of the circumference of the track. The assembly may further comprise: a slip ring, where the slip ring provides power between a battery and at least one of: the first motor, the second motor, and the camera.

A system embodiment may comprise: a stabilizing assembly comprising an inertial measurement unit (IMU) component having a processor and memory, and where the processor is configured to: detect, via the IMU component, a position and a change in position of the stabilizing assembly, where the detecting is based on received data from a set of devices; transmit, by the IMU component, the detected position data to a processor controller; determine, by the processor controller, a set of corrective actions in response to a received position data from the IMU component; and transmit, by the processor controller, command data comprising the set of corrective actions in the form of commands to a motor controller, where the commands transmitted to the motor controller effect a movement of a motor thereby repositioning the stabilizing assembly. Optionally, the set of devise is a set of one or more accelerometers and a set of one or more gyroscopes. In one embodiment, the processor is further configured to transmit command data comprising the set of corrective actions in the form of commands to a motor controller coupled to a motor, the motor configured to move the stabilizing assembly about a roll axis relative to a local plane. In another embodiment, the processor is further configured to transmit command data comprising the set of corrective actions in the form of commands to a motor controller coupled to a motor, the motor configured to move the stabilizing assembly about a pitch axis relative to a local plane.

BRIEF DESCRIPTION OF THE DRAWINGS

Embodiments are illustrated by way of example and not limitation in the figures of the accompanying drawing, and in which.

DETAILED DESCRIPTION

Figure 1:
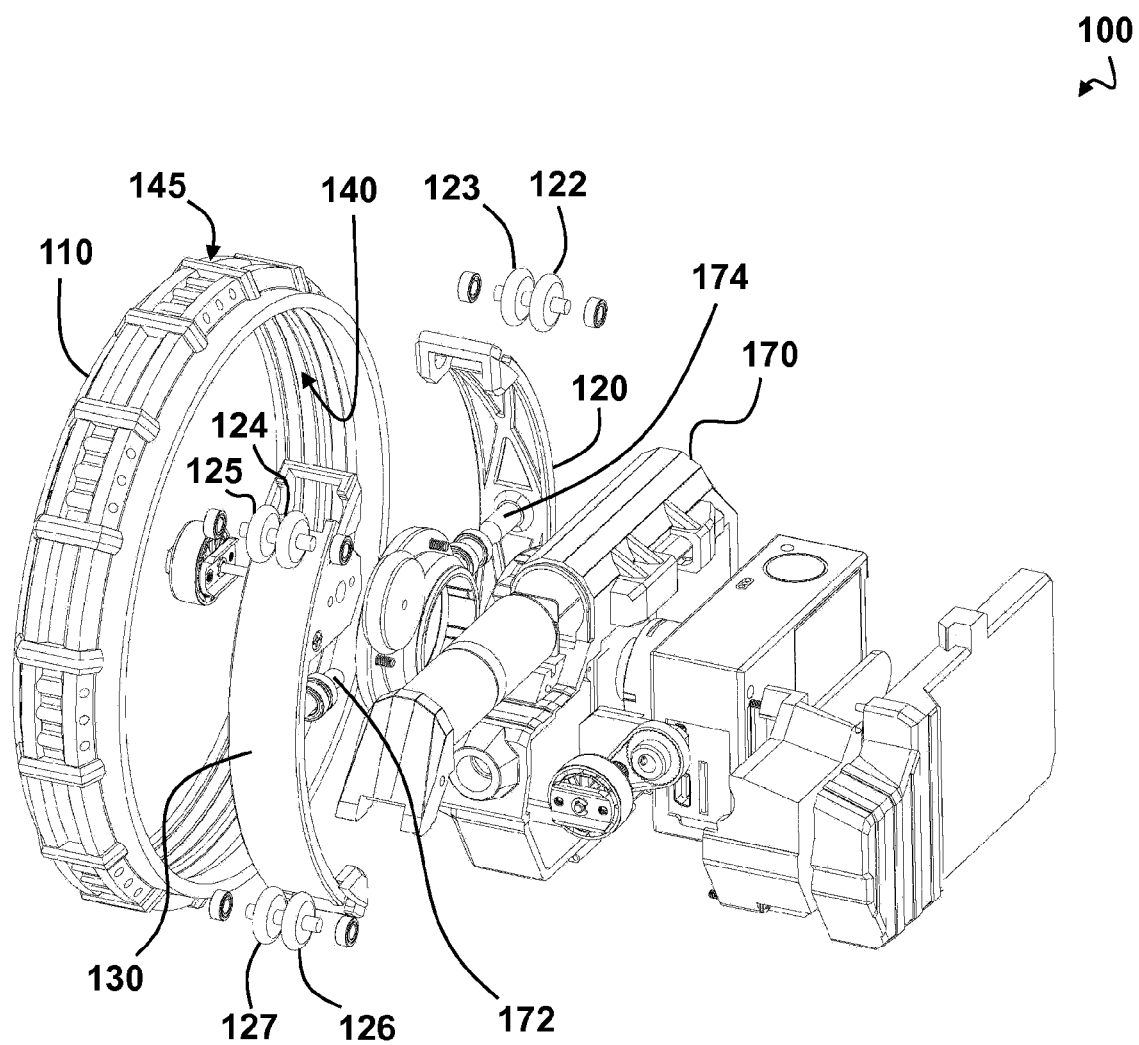
FIG. 1 depicts an exploded perspective view of a stabilizing assembly.

An image stabilization system comprising a pivoted support structure with a track and bogie is disclosed as having a two-axis ring style object stabilizing gimbal. In applications where the nodal point of an image capture device, e.g., a camera, and the center of gravity of the track and bogie gimbal system do not align, functional components for the gimbal may be utilized to bring the center of gravity in line with the nodal point, which may subsequently be aligned, both optically and physically, with the pivot point of the gimbal. Such design may allow for smaller and cheaper motors to be used to drive the components, due to lower torque loads as a result of the center of gravity being optically centered. The rotational moment may also be reduced via using a lightweight track and bogie design where the camera payload may ride in a dolly with two separate self-centering bogies riding in a track embedded in the ring. The bogies may be designed to weigh less than a conventional slew ring, thereby giving a reduced rotational moment, and further enabling smaller motors to be utilized. In embodiments of the track and bogie based optically centered gimbal system, the motors may receive their drive commands via a six-axis inertial measurement unit (IMU) comprising a set of gyroscopes and accelerometer units, where the gyroscope works to dampen oscillations and may reduce unwanted movements in the camera. Additionally, the system may also receive remote drive commands to hold a new heading and position based on received position information. In one exemplary embodiment, the system utilizes an IMU comprising one or more accelerometers to detect a rate of acceleration and a set of gyroscopes to detect changes in rotational attributes, e.g., pitch, roll, and yaw. The IMU may be responsible for leveling the system to be parallel with a local plane. Optionally, a magnetometer may be used to effect the calibration against any potential orientation drift.

In one embodiment of the optically centered image stabilization system, the system comprises a track and bogie based optically centered gimbal where the track and bogie may be situated and/or located near, or at, the node of the system. That is, the track and bogie may have all the axes of rotation centered on the nodal point of the image capture device, e.g., an optical center of a lens and sensor of the camera. In some embodiments, the image stabilization system may utilize functional gimbal components, e.g., batteries and motors, to serve as counterweights for an optimized center of mass or center of gravity (CG), to effect the relocation of the CG to the nodal point. The system may further comprise an unbound internal dolly where, for example, the camera, may be based on or ride on thereby allowing unrestricted rotation on the roll axis. The CG may be the distribution of mass at a unique point where the weighted relative position of the distributed mass sums to zero, that is also the point in the system where the resultant torque due to gravity forces disappears. Optionally, the system may have a limited pivot on the tilt axis, i.e., the rotational axis that is perpendicular to the orbital plane.

In another embodiment, an external yaw axis may be controlled wirelessly, for example, via near field communication (NFC)—limited to, for example, 20 cm, to establish radio communication and/or Bluetooth® Low Energy (BLE), where the external yaw axis may be a wholly separate self-sustaining component. Embodiments may provide power to the system via an on/off switch where the source of energy, e.g., a battery, may always be connected and readily available.

Exemplary embodiments of the system may comprise electronic dampening and motor control, where the motor control may be pre-set to various modes, e.g., heading hold, jolt dampening, custom, etc., and achieved via an onboard switch, knob, and/or selector. Optionally, the external frame, i.e., the dolly guide or mount, may be made of glass-reinforced nylon or compression molded composite. Additionally, the system may provide compatibility with expandable components such as: a wireless video downlink, a remote control, an external yaw module, etc., where the components may be added via, for example, an adaptor or add-on module.

In one embodiment, the system may utilize a track and bogie based roll assembly, which may allow a smaller drive motor to be used. The drive motor may be used to overcome any friction caused from the movement of the wheels of the bogie. The system may comprise a main pivot surface where, for example, components may be detachably attached, allowing an unlimited roll due to all the components being located on the main pivot surface or bogie. Additionally, the design may allow for unlimited operating time via an electromechanical device that allows the transmission of power and electrical signals from a stationary to a rotating structure, e.g., a slip ring, for power transfer. The system may also transfer data wirelessly, e.g., via wireless communication, thereby making a single power slip ring sufficient for transferring or providing power to the system.

Embodiments of the optically centered track and bogie system may provide modular expandability to multiple axes via adding additional axes by interfacing with the existing power infrastructure, wireless communication system, and control board. In addition, the system may utilize short range wireless data transfer to allow further integration of additional components, e.g., telemetry, position information, and/or video downlink. In this embodiment, wireless data transfer mechanisms may also, for example, use radio, hypersonic and/or infrared systems.

In an embodiment where the system supports an image capture device comprising an optical lens or assembly of lenses, for example, a photographic lens or photographic objective, the system may be designed with an emphasis on placing the nodal point of the lens at the central pivot point, thereby eliminating any displacement or difference in the apparent position of an object being viewed along two different lines of sight, i.e., parallax. In portable photography equipment, the track and bogie system may be used in order to allow a balanced movement for the camera and lenses where the gimbal head may rotate a lens around the center of gravity of the lens, thus allowing for easy and smooth manipulation while tracking moving objects.

A ring of the gimbal stabilizing assembly provides structural support for components of the gimbal stabilizing assembly. The ring is shown in isolation in FIG. 7A, and as part of the assembly of the disclosure in FIGS. 1-4, for example. The ring's center point/axis defines the location of the optical axis of an image capture device to be held therein and stabilized. Also, as an example, the central axis of an inward circular track provided on an inward surface of the ring defines the roll axis for the image capture device.

FIG. 1 depicts an exploded perspective view of a stabilizing assembly 100, where the stabilizing assembly 100 is optically centered and may comprise a ring, having a track 110, and a plurality of bogies 120, 130. The rotational axes of the bogie wheels 122-127 may be offset inwards from the ring contact surface 140, enabling the assembly to have a smaller outer diameter. The usage of bogie wheels 122-127 further reduces the contact area between the inner components and the outer ring 145, thereby reducing friction between the track 110 and the inner components. Optionally, the bogie ring may also have a natural dampening feature, where with the bogie ring segments acting like a leaf spring a preload may be put on the bogie wheels 122-127, which in turn may be lined with rubber, or other similar material, for further dampening. In this embodiment, the tapered track walls prevent the bogies 120, 130 from having a chattering or walking tendencies. Additionally, FIG. 1 shows on the right side thereof, a rear cover and electronics cover between the camera and the rear cover.

In the embodiment comprising the track and bogie system, the outer diameter may be reduced by using the inwardly positioned bogie and wheels, and consequently, the overall weight of the system may also be reduced in the process. In the embodiment using a slip ring in order to have power transmitted to the inner components, power may be provided directly in to the pivot axis via the slip ring.

Depicted in FIG. 1 are two bogies 120, 130 that may ride in the track 110. The bogies 120, 130 are also shown in isolation in FIG. 7B. The bogies 120, 130 comprise an arcuate chassis having pockets at both ends thereof, with a wheel assembly rotatably mounted in each pocket. The wheel assemblies may comprise a pair of identical wheels 122-127 rigidly connected together in spaced relation by a central shaft. In some embodiments, each wheel assembly may be constructed with only a single wheel, either narrow or wide, or using more than two wheels. The wheel assemblies ride in the track 110, and thereby the bogies 120, 130 travel about the roll axis. For example, each of the bogies 120, 130 may span ninety degrees, or one quarter of the circumference and the ring may have a diameter of 120 mm, or 80 to 400 mm. An exemplary range of the diameter of the track may be 105 to 125 mm, or 115 mm.

The chassis may have a width of 25 to 30 mm, and the wheels of the wheel assemblies may have diameters of 10 mm. The distance from centerline to centerline between the wheels of each wheel assembly may be 15 mm. The depth the wheels of the wheel assemblies engage into the tracks—as may be understood from FIG. 6B advantageously—may be less than 3 mm, for example, on the order of only 1.5 mm. The primary weight components of the bogies 120, 130 may be the ball bearings within the wheels 122-127, and there may be only six to eight small ball bearings per wheel, and a total of eight wheels. That is, with the small flat dimension of the wheels in the track 110 and the light weight of the bogies 120, 130, more material may be dedicated to increasing the structural integrity of the assembly. Additionally, the material and mass may be used to move the camera, for example, about the roll axis.

A tilt plate 170 of the assembly is shown generally in FIGS. 1, 2, 3, and 4, and may be positioned within the ring. It may be supported at one end by a bearing shaft 172, which extends radially inward from a central portion of the chassis, shown on the left of FIG. 7B. At the other end it is supported by a pivot shaft 174, which extends radially inward from the chassis shown on the right of FIG. 7B. The tilt plate may be rotatable about an axis passing through the aligned bearing shaft 172 and the pivot shaft 174 thereby allowing pitch axis movement of the image capture device. The tilt plate may be rotatable by a tilt motor or a pitch motor which is supported by and rotatable with the tilt plate. This motor is depicted for example in FIGS. 1-4, and it may be a direct drive motor. In one embodiment, the chassis may have opposite end pockets in which a set of wheel assemblies may be operatively mounted, and another chassis may be positioned at the opposite end pockets in which another set of wheel assemblies may be operatively mounted. Additionally, a chassis may have a central, radially inwardly disposed bearing shaft for the tilt plate and another chassis may have a central, radially inwardly disposed pivot shaft for the tilt plate. An exemplary definition of two points that are diametrically opposed may be that if they are on opposite ends of a diameter An image capture device, for example, a GoPro, is shown in FIGS. 1-4, and may be releasably held by and inside of the tilt plate of the stabilizing assembly. It may be held such that its optical axis is coincident with the center axis of the ring or the track. The arrangement of the other components, for example, pitch motor, battery, etc., of and carried by the tilt plate may be designed such that the center of mass thereof is also coincident. The bogies, tilt plate, and ring may form the gimbal of the exemplary stabilizing gimbal assembly. A yaw motor may be provided to adjust the position of the camera about the yaw axis as shown by the arrow in FIG. 8. An exemplary yaw motor may be mounted sandwiched between the ring and a stabilizing handle, as may be understood from FIG. 4.

Figure 2:
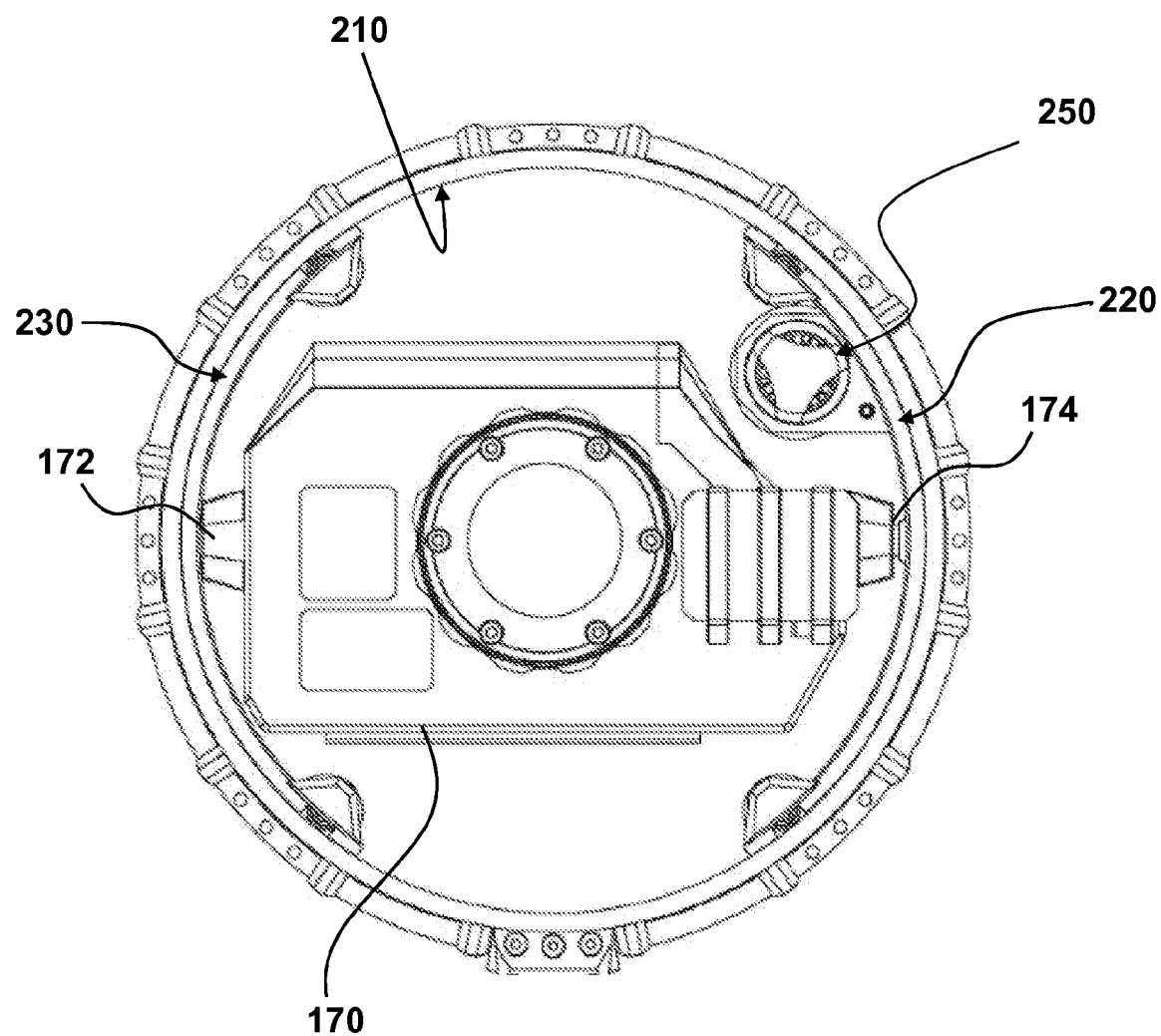
FIG. 2 is a front end view of the assembly of FIG. 1.

FIG. 2 is a front end view of the assembly of FIG. 1. In the exemplary embodiment illustrated in FIG. 2, the gimbal is depicted as being centered and having a bogie 220, 230 and track 210 ring roll system. In one embodiment, the system comprises a stabilizing controller to balance, support and orient a device, where the stabilizing controller comprises a processor and memory to send command data for controlling motion about each of the X-axis, Y-axis, and Z-axis, where, for example, the three axes are mutually perpendicular to one another, and isolated from the motion of the other axes. In this embodiment, the system may control the rotational motion about at least one of the X-axis, Y-axis, and Z-axis, (see also FIG. 8) thereby creating a gimbal stabilization system. A set of one or more sensors (not shown) may be configured to sense movement of the stabilization system and provide movement data to the controller having a processor and memory, whereby the controller may send signals to a motor 250 coupled to the sensor and to the track 210 and bogies 220, 230 in the illustrated embodiment. The stabilization system may be configured to rotate the object about a first axis in response to the movement data—provided by the sensors—to maintain the balance of the object. In one embodiment, a user may configure the stabilization system to a desired setting, where for example, the system allows for some deflection by the image capture device for a scenario that the user needs to isolate the image capture device. Alternatively, the user may configure the system to allow for some desirable movement in order to provide a sense of movement to the image capture device.

Figure 3:
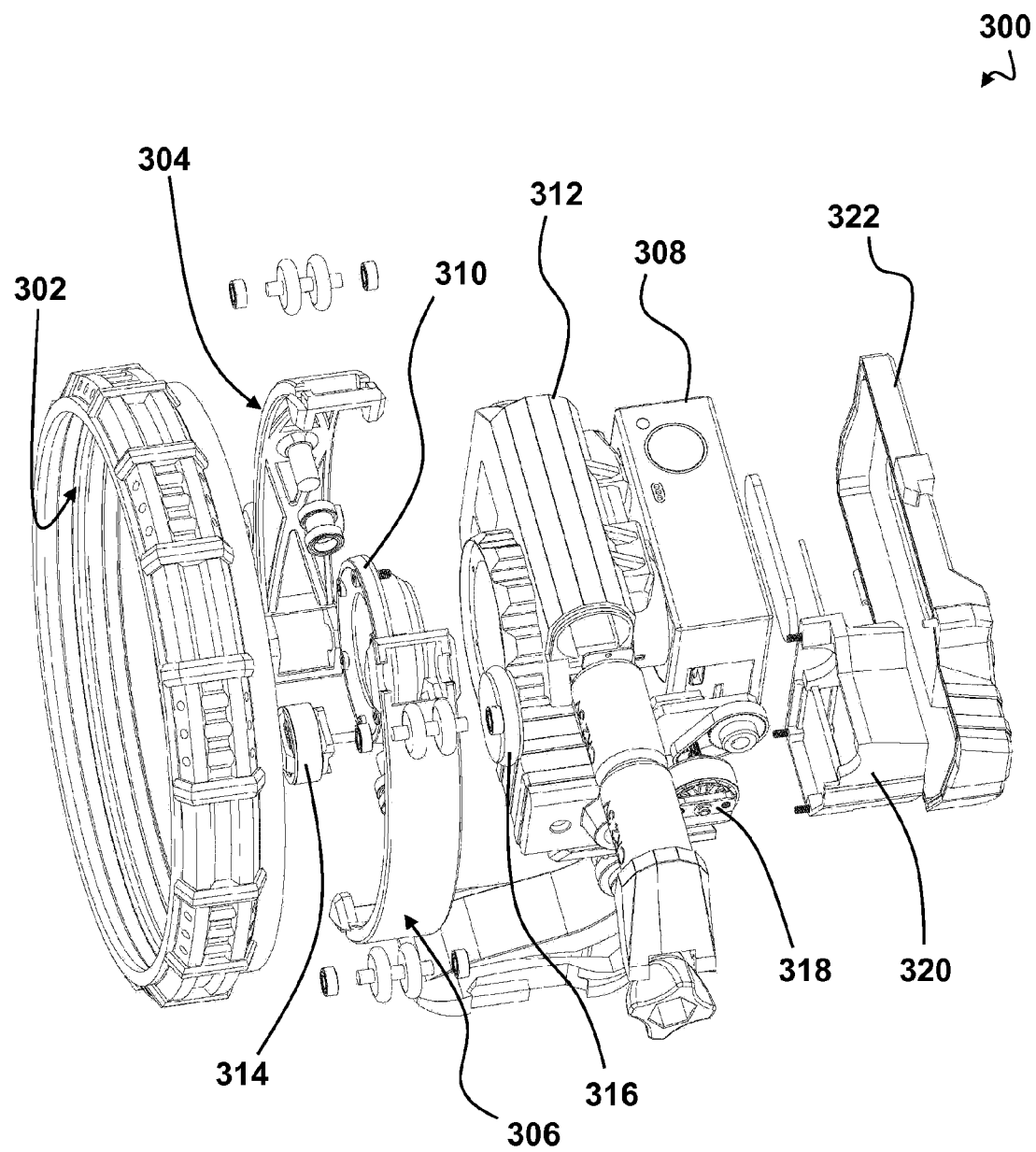
FIG. 3 is another exploded perspective view of the assembly of FIG. 1.

FIG. 3 is another exploded perspective view 300 of the assembly of FIG. 1. This exploded perspective view depicting the components of the system may better illustrate the moving parts of the system. A stabilizing controller of the optically centered system comprising a gimbal with a track 302 and bogie 304, 306 may be used to balance, support, and/or orient a device, e.g., an image capture device 308. The stabilizing controller may comprise: a controller having (a) an addressable memory, the memory comprising a rule set; and (c) a processor configured to: (i) receive movement data based on detected movement or change of position of the stabilization system from a set of points of rotation; (ii) determine a set of corrective action control inputs, where the corrective action is to maintain the desired orientation and balance the object; and (iii) send signals comprising the corrective action commands to a motor coupled to the sensor and to the track and bogie. Optionally, the motor may be configured to rotate the gimbal in either clockwise or counterclockwise angular directions. The assembly may comprise a lens cover 310, e.g., a standard or aftermarket product for use with the image capture device 308. A tilt plate 312 may connect the image capture device 308 to one or more bogies 312. A roll motor 314 and drive wheel 316 may be connected at a roll motor mount. The assembly may also comprise one or more tilt motors 318, which may be protected by an electronics cover 320. In some embodiments, a rear cover 322 may be used to protect the assembly from damage and/or the elements.

Figure 4:
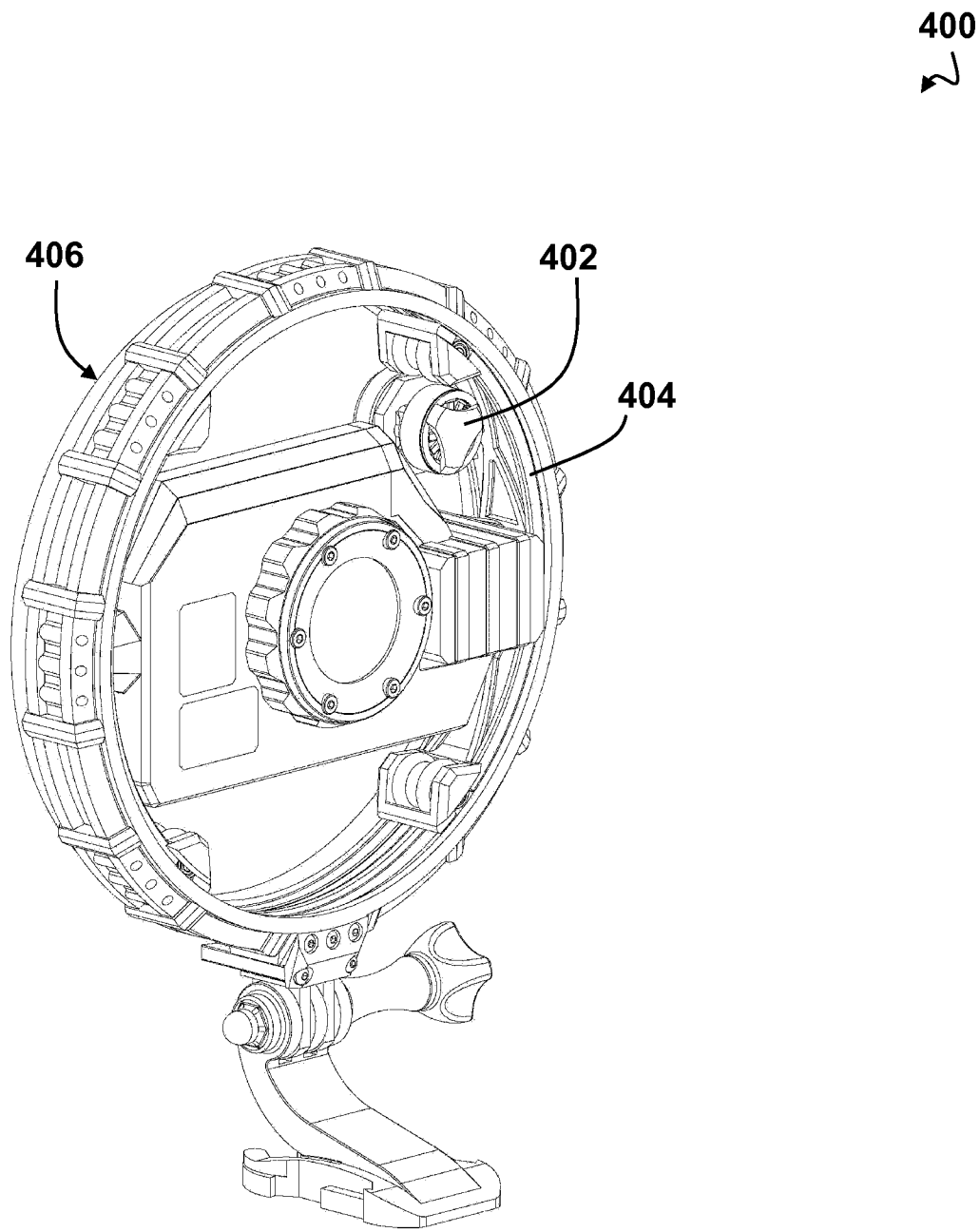
FIG. 4 is a front perspective view of the assembly of FIG. 1.

FIG. 4 is a front perspective view 400 of the assembly of FIG. 1. The figure shows that the roll motor 402 may be mounted to one of the bogies 404, extending inwardly relative to the ring 406 and movable with that bogie 404. This may also be understood, for example, in FIGS. 2, 6A, and 7B. In one embodiment, since the bogies, along with the tilt plate, and other components, are so light, a small lightweight motor may be used. The motor may be a gear drive, outrunner direct current brushless motor.

Figure 5:
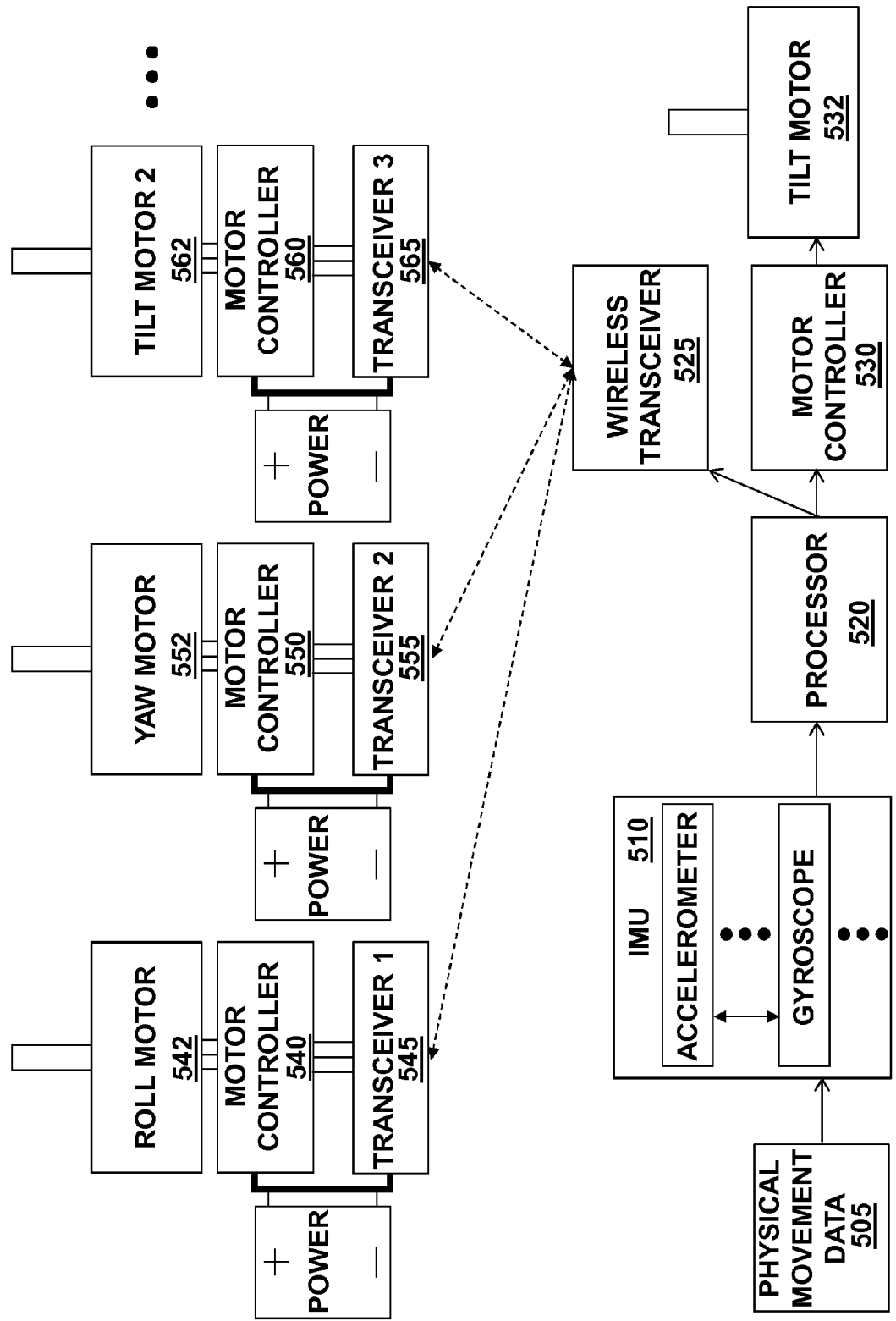
FIG. 5 is a functional block diagram of the motive system of the assembly.

FIG. 5 is a functional block diagram of a motive system of the assembly. In one embodiment, the assembly may utilize a wireless data communication system to enable the transfer of control data between the IMU 510 and the different motors 532, 542, 552, 562. The wireless communication, for example, short-range communications, may allow the functional rotation of a tilt plate within the ring which may be impractical to implement with the use of wires. The IMU 510 may receive physical movement data 505 placed in various locations along the assembly. In one exemplary embodiment, the IMU may comprise a set of accelerometers, e.g. three accelerometers, and a set of gyroscopes, e.g., three gyroscopes, to gather or collect measurements on acceleration and orientation of the assembly, via the received physical movement data 505, on the three different axes so as to effect the maintaining of the orientation of the assembly. In one embodiment, the IMU 510 may process the physical movement data and communicate the gathered or collected information with a processor 520 where the processor may process the received information and send command data to a first tilt motor controller 530, depicted as a wired communication in this example. In this embodiment, the processor 520 is depicted as sending command data, via a wireless transceiver 525. The command data may then be received by a set of one or more transceivers 545, 555, 565 which may then communicate the command data to a roll motor controller 540, a yaw motor controller 550, and a second tilt motor controller 560, respectively, up to an N number of motor controllers. The command data transmitted wirelessly, or via a wire, may then effect the movement of the first tilt motor 532, the roll motor 542, the yaw motor 552, and the second tilt motor 562, respectively. Accordingly, the IMU 510, via the processor 520, sends command data to the motor controller of a roll motor, a tilt or pitch motor, and a yaw motor. The number of motor controller may be expanded based on design preference and the referenced motor controls are for illustration purposes only.

In one embodiment, the command data may be sent to the motor controllers wirelessly, for example, via near field communication (NFC), where the motor controllers 540, 550, 560 effect the movement of the assembly along the different axes, and may be doing so as a wholly separate self-sustaining component. Exemplary assembly embodiments may, however, provide power to the system via a slip ring power circuitry.

In one exemplary embodiment, at each point of rotation, via a set of sensors, a component may have the ability to transmit its position data to the main controller via, for example, a low powered wireless transmitter. The exemplary component may comprise a node in a wireless sensor network that may be capable of performing data processing, gathering sensory information, and communicating with other components or connected nodes in the network. Exemplary components may comprise, along with the set of sensor nodes, a microcontroller, a transceiver, an external memory, and a power source. In an exemplary embodiment, the controller may in turn respond back or output corrective action control inputs to maintain the desired orientation based on a horizon level or alternatively, based on a specific user input which may control the user determined orientation level. In some embodiments, power transfer may also be achieved with slip rings and/or batteries. This wireless position data transmission may effect a movement control of the gimbal or, in some embodiments, servo controlled components.

Figure 6A:
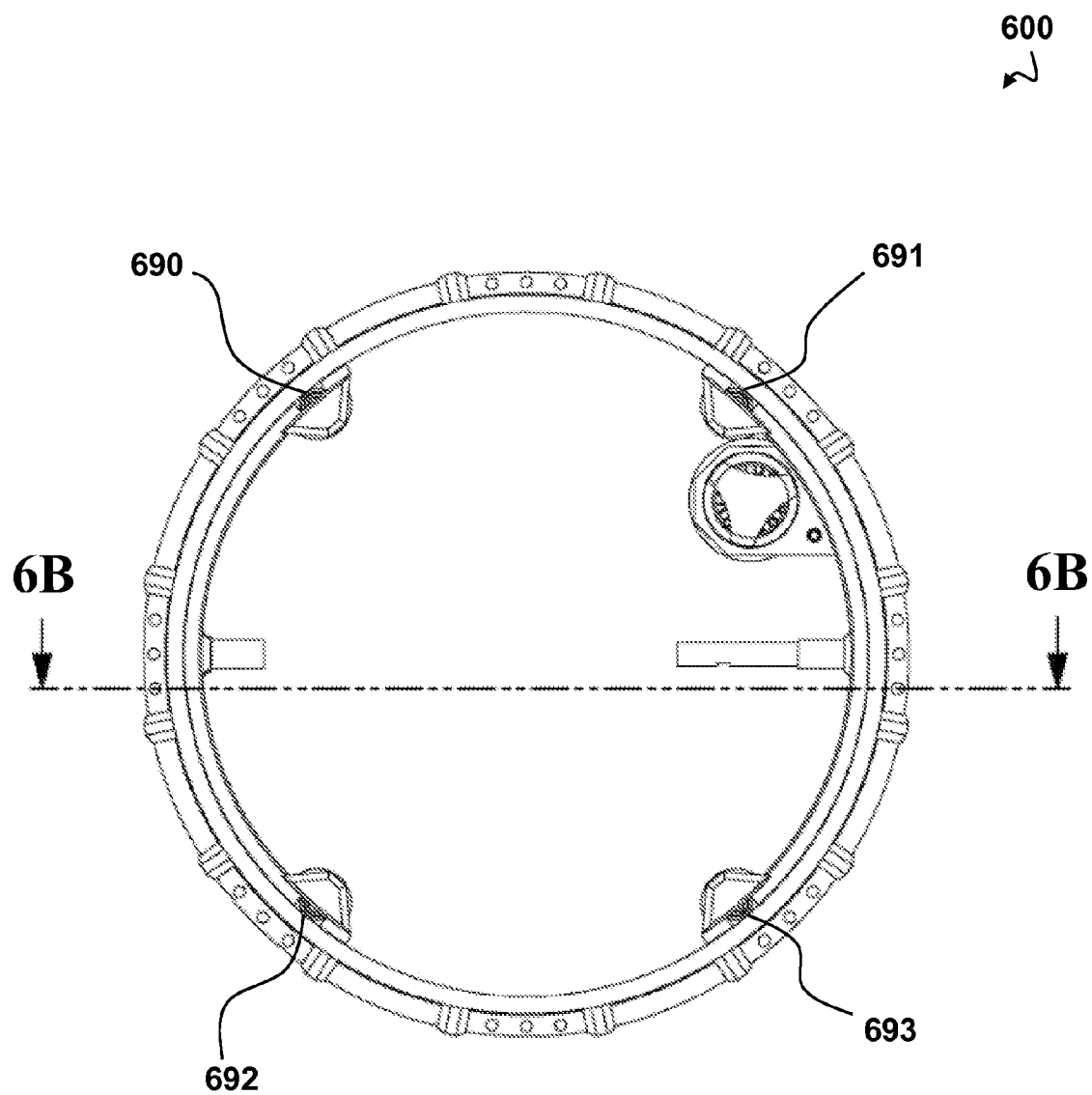
FIG. 6A is an end view of the ring and bogies of the assembly.
Figure 6B:
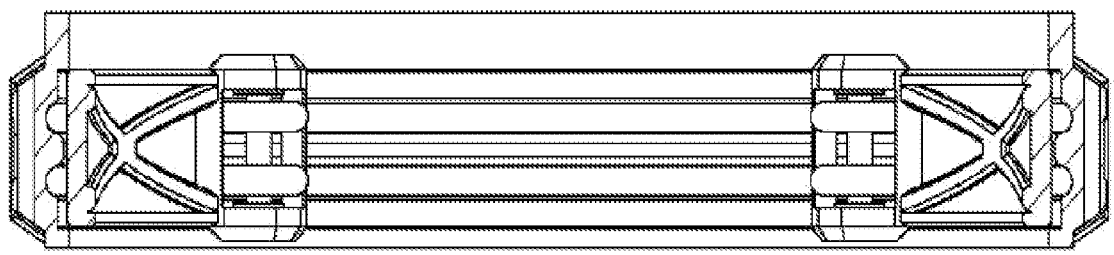
FIG. 6B is a cross-sectional view taken on line 6B-6B of FIG. 6A.

FIG. 6A is an end view 600 of the ring and bogies of the assembly with a line 6B showing the cut out section view of the assembly. FIG. 6B is a cross-sectional view 601 taken on line 6B-6B of FIG. 6A where the wheel contact areas 690, 691, 692, 693 are shown in the ring. In one embodiment, there may be eight wheels in four sets of two wheels each, where each bogie comprises two sets of wheels. As previously mentioned, the number of wheels may be based on a design choice where one or more wheels may be used.

Figure 7A:
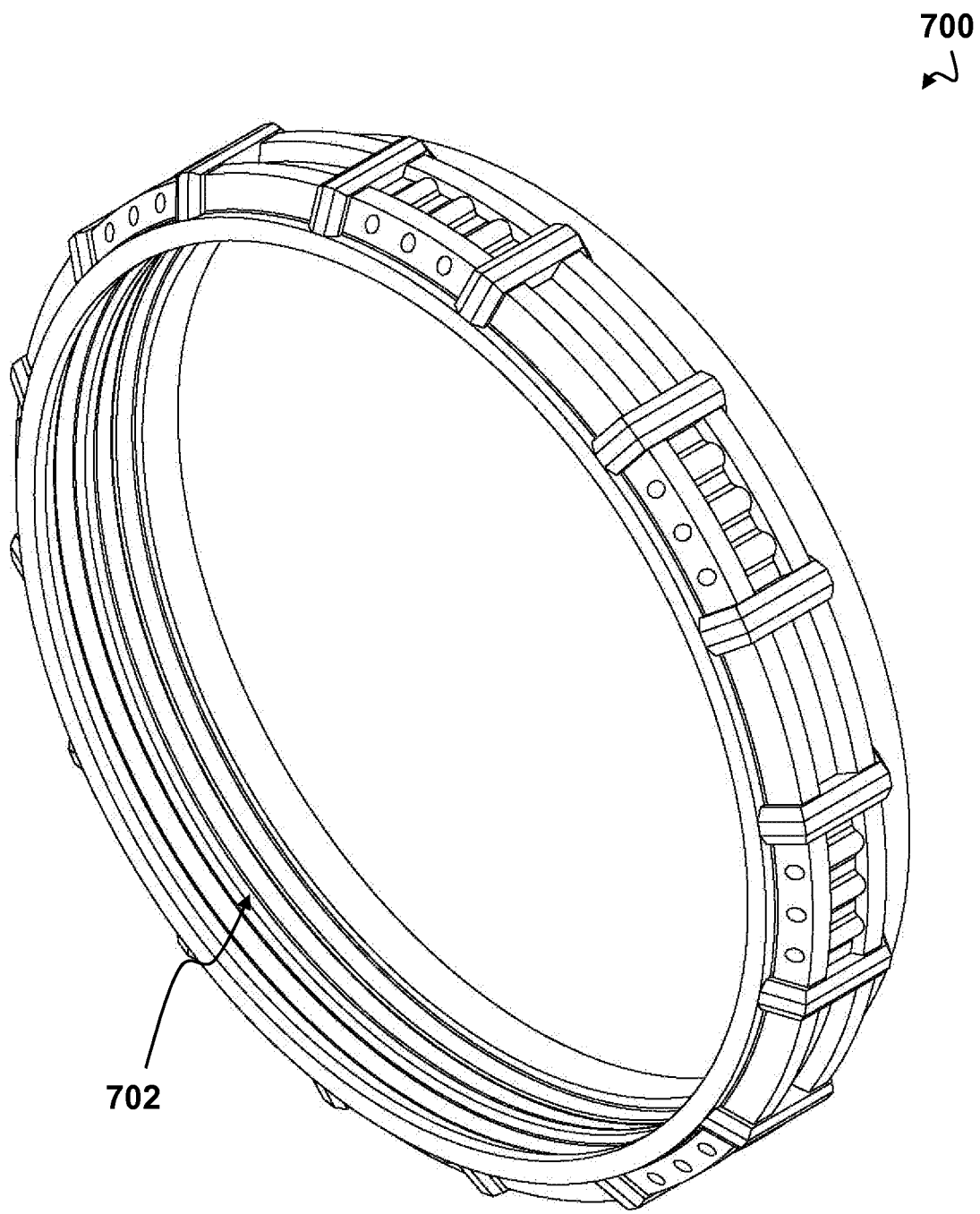
FIG. 7A is a perspective view of the ring of the assembly in isolation.

FIG. 7A illustrates a ring 700 of the optically centered assembly comprising a track and bogie where the ring comprises track walls that may be tapered so as to prevent the bogies from having chattering or walking tendencies. The track 702 may receive a mounting plate enabling the placement of additional objects on the track. In one embodiment the outer ring may feature a universal dovetail mounting system, with an inner dovetail lock, effecting the movement of a mounting plate to any position on the ring 700, i.e., the position is infinitely adjustable. Embodiments utilizing the dovetail mounting system may be more advantageous when using multiple mounting points for rigidity. The exemplary dovetail lock design may be located on the outer portion of the ring 700, where it is used to mount the ring 700 itself to an object, or more rings for further expansion. The embodiment featuring an adaptable mounting system allows for a mounting system that may also be used for adding additional powered axis.

Figure 7B:
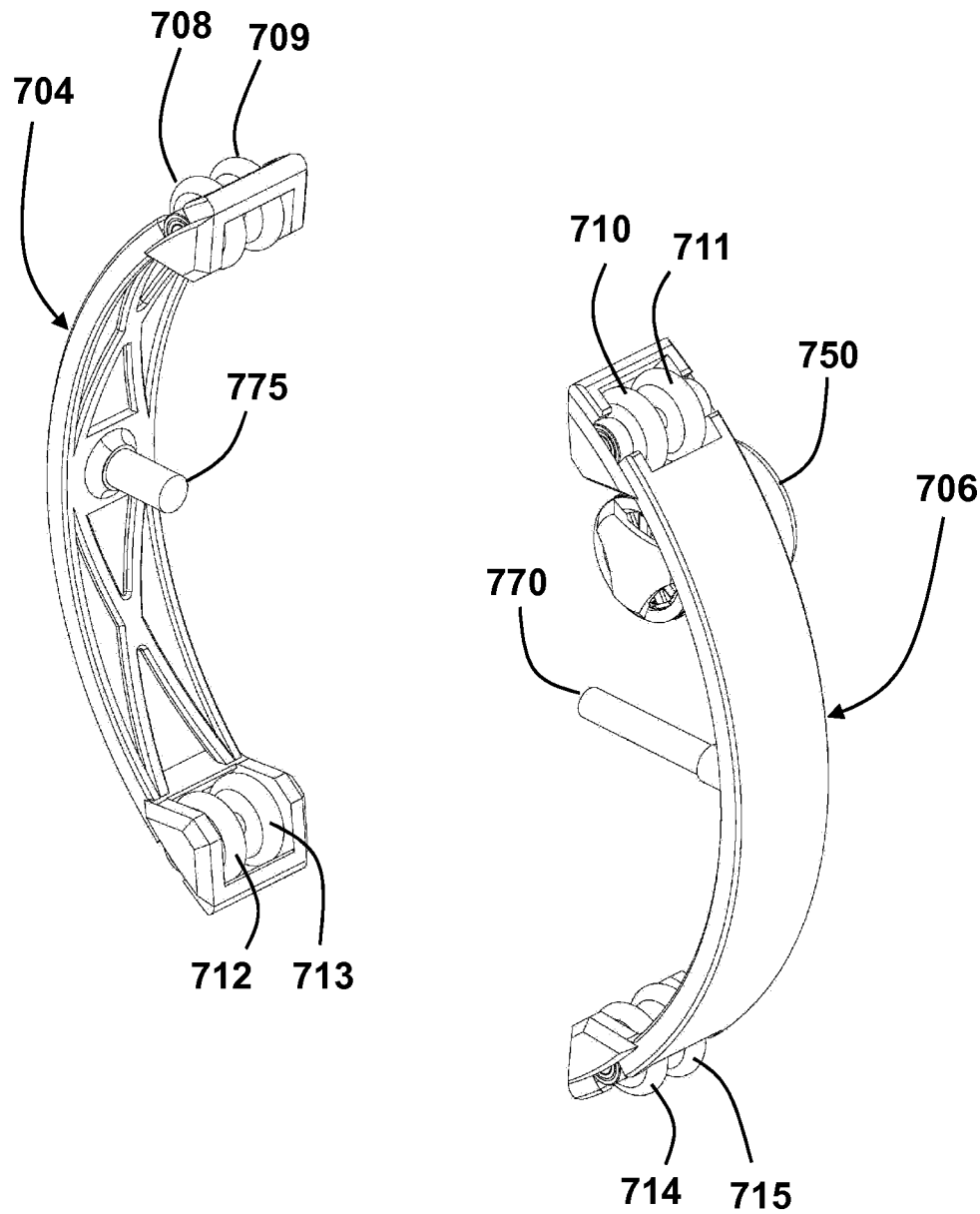
FIG. 7B is a perspective view of the bogies of the assembly illustrated in isolation.

FIG. 7B is a perspective view of the bogies 704, 706 of the assembly illustrated in isolation where the rotational axes of the bogie wheels 708-715 are offset inwards from the ring contact surface, enabling a smaller outer diameter. The bogie wheels 708-715 may be secured in place by the walls of the track and allow to be affixed firmly onto the track. The roll motor 750 may also be mounted on the inner surface of one of the bogies 706, where the roll motor 750, mounted to one of the bogies 706, may extend inwardly relative to the ring and movable with that bogie 706. The figure also depicts two structure members 770, 775 pointing inward from each bogie 704, 706 and toward the other bogie 704, 706. The structure members 770, 775, for example, pivot shafts may connect a tilt plate to the bogies 704, 706 where the tilt plate may house a conventional mechanical gear reduction system to effect the movement of the assembly about the pitch axis. Accordingly, the tilt motor, via a gearbox and the structure members, may be used to detachably attach the tilt plate to the bogie 704, 706.

Figure 8:
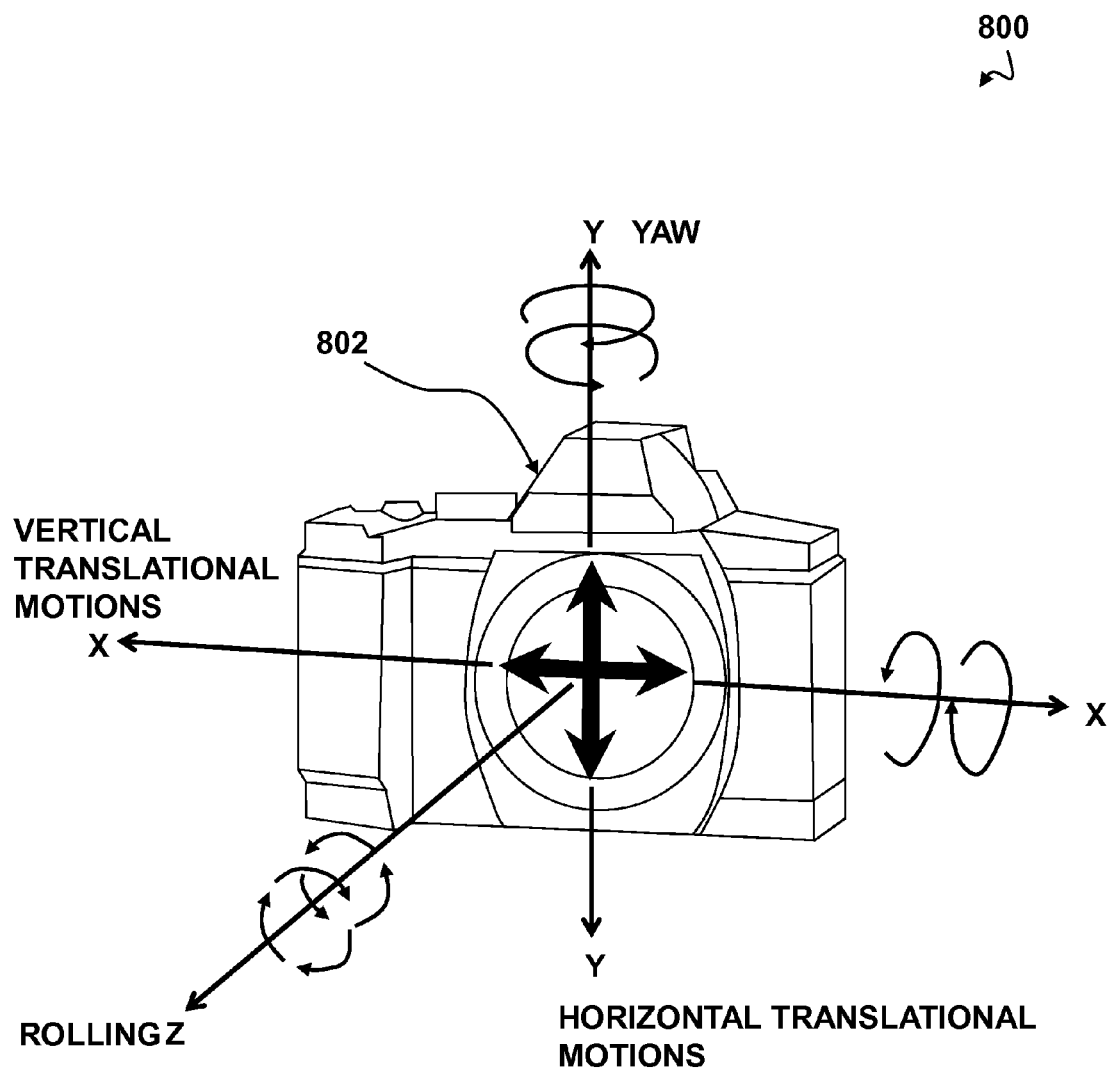
FIG. 8 is a diagrammatic view of an exemplary image capture device illustrating the different directions of stabilizing motion.

FIG. 8 is a diagrammatic view 800 of an exemplary image capture device, for example, a camera 802, illustrating the different directions of stabilizing motion. The camera 802 may be detachably attached to a track and bogie assembly, where it is held in place securely via a camera housing. Motion of the camera about the roll axis, Z, the pitch axis, X, and yaw axis, Y is depicted by the use of arrows.

Figure 9:
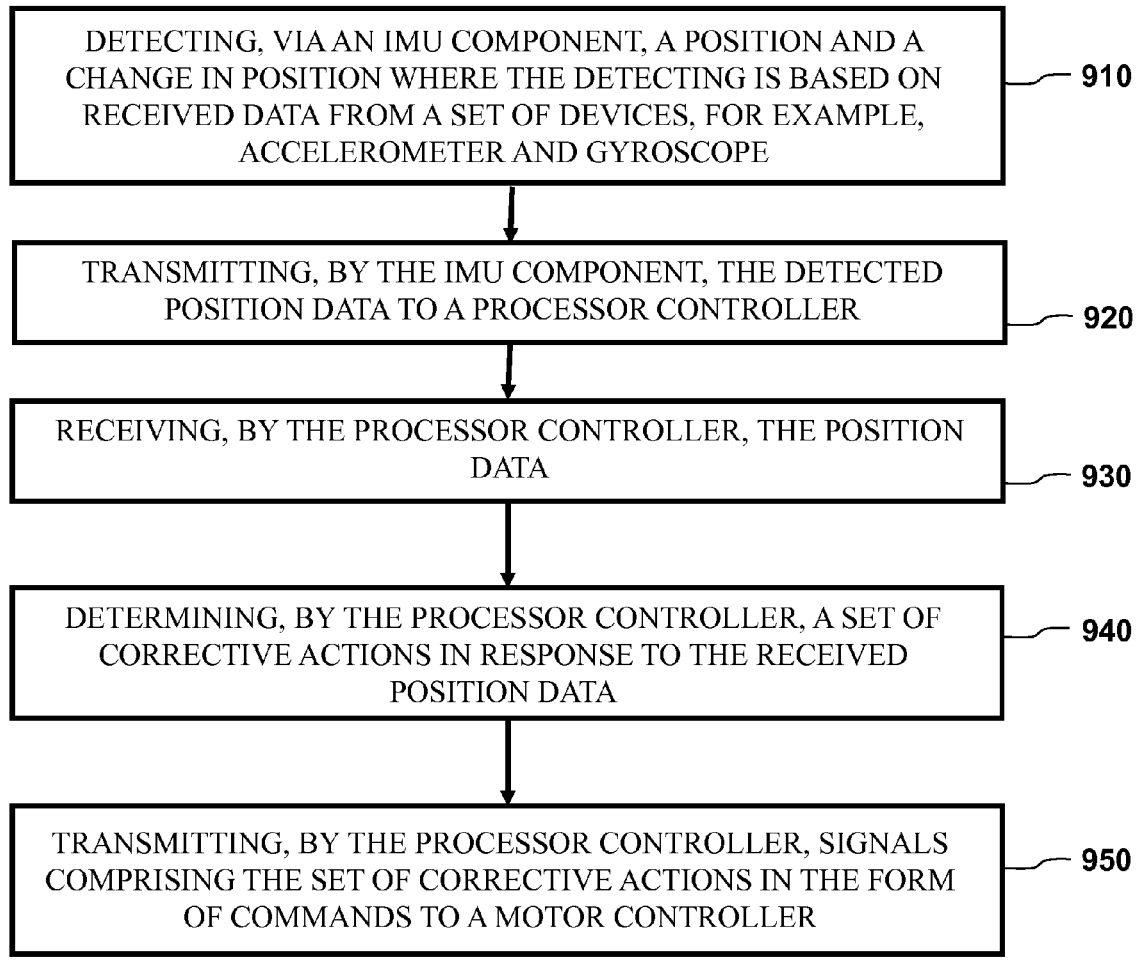
FIG. 9 is a flowchart of an exemplary method of the controller of the assembly.

FIG. 9 is a flowchart of an exemplary controller of the assembly system controlling the set of motors in which the system comprises a computer and/or computing circuitry that may be configured to execute the steps as depicted. The method depicted in the flowchart includes a controller having memory and a processor executing the steps of: detecting, via an IMU component, a position and a change in position where the detecting is based on received data from a set of devices, for example, accelerometer and gyroscope (step 910); transmitting, by the IMU component, the detected position data to a processor controller (step 920); receiving, by the processor controller, the position data (step 930); determining, by the processor controller, a set of corrective actions in response to the received position data (step 940); and transmitting, by the processor controller, signals comprising the set of corrective actions in the form of commands to a motor controller (step 950).

An exemplary gimbal assembly positioned at the center of balance of the system for stabilizing an image capture device with a controller may have a center post coincident with the centerline balancing axis of the gimbal and track with a bogie and may have a longitudinal balancing axis, where the motion about each of the X-axis, Y-axis, and Z-axis may be mutually perpendicular to one another. In some embodiments, an exemplary sensor gimbal may also be utilized. The sensor gimbal may comprise a sensor, e.g., an imager, coupled to a direct-drive motor, with the motor in a direct-drive configuration with the imager. The sensor gimbal may be coupled to the track and bogie through a sensor gimbal support to provide an unobstructed movement on the track. In alternative embodiments, the sensor gimbal may be one of a plurality of sensor gimbals. In some embodiments where the sensor gimbal is illustrated as having a motor, the direct-drive motor may rotate the sensor in a direct-drive configuration on the sensor gimbal. In an exemplary "direct-drive configuration" the sensor may be rotatably driven by the motor without the benefit of reduction gears, cabling and/or belt drives. In an alternative embodiment, the gimbal sensor may be coupled to a rotatable shaft of the motor via a linkage. In another alternative embodiment, the sensor may be coupled to two or more motors to provide movement of the gimbal sensor in two or more axes.

Figure 10:
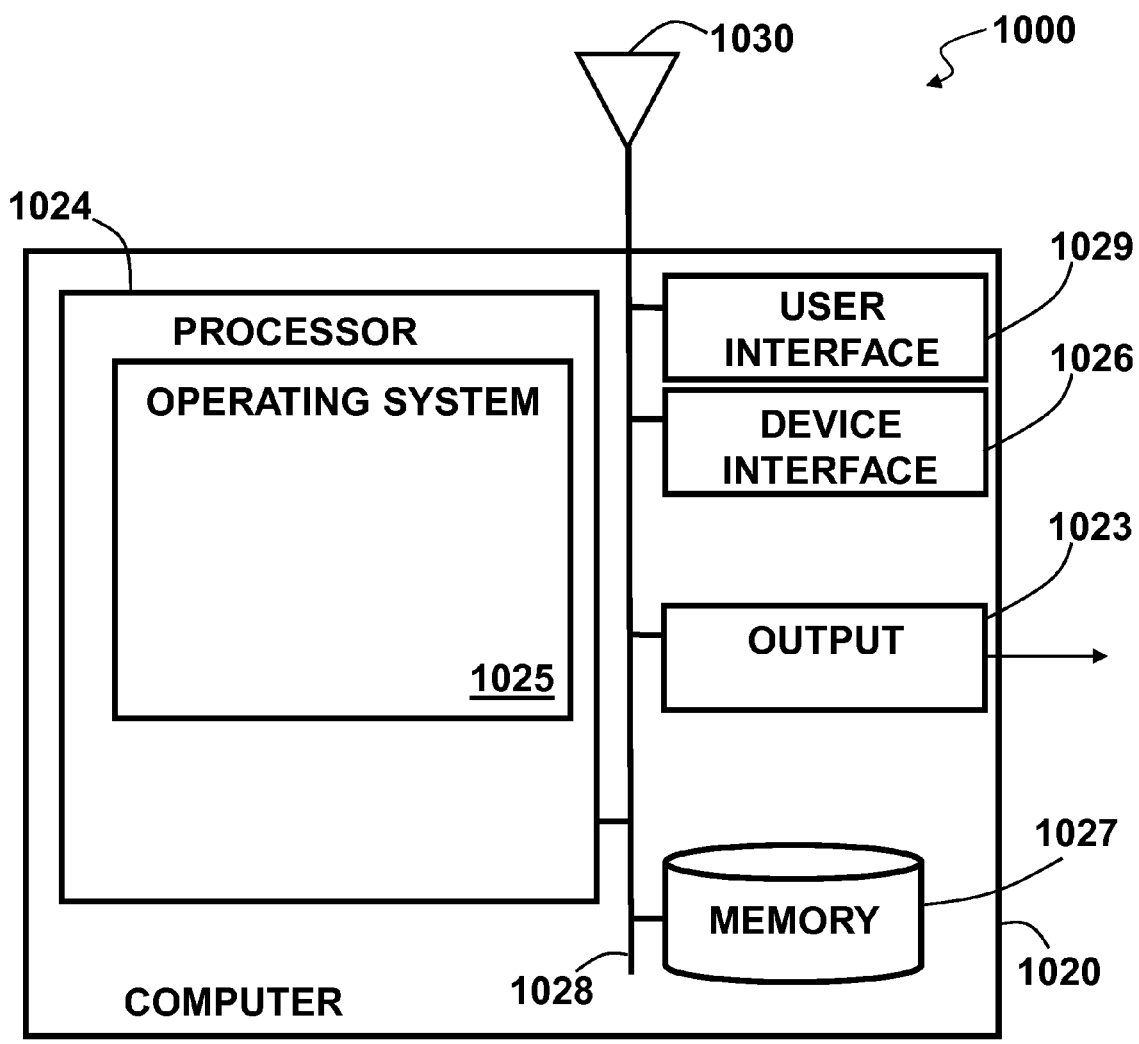
FIG. 10 is an exemplary top level functional block diagram of a computing device of the assembly.

FIG. 10 illustrates an exemplary top level functional block diagram of a computing device embodiment 1000. The exemplary operating environment is shown as a computing device 1020 comprising a processor 1024, such as a central processing unit (CPU), addressable memory 1027 such as a lookup table, e.g., an array, an external device interface 1026, e.g., an optional universal serial bus port and related processing, and/or an Ethernet port and related processing, an output device interface 1023, a receiver 1030, e.g., antenna, and an optional user interface 1029, e.g., an array of status lights, and one or more toggle switches, and/or a display, and/or a keyboard and/or a pointer-mouse system and/or a touch screen. Optionally, the addressable memory may, for example, be: flash memory, EPROM, and/or a disk drive and/or another storage medium. These elements may be in communication with one another via a data bus 1028. An operating system 1025, such as one supporting an optional web browser and applications, the processor 1024 may be configured to execute steps of a main controller configured to control the optically centered image stabilization system, where the system comprises a track and bogie based optically centered gimbal according to the exemplary embodiments described above.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated. It is contemplated that various combinations and/or sub-combinations of the specific features, systems, methods, and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A stabilizing assembly comprising:
   a ring having an inwardly disposed track;
   a first bogie having an arcuate first chassis member, a first wheel assembly, and a second wheel assembly;
   a second bogie having an arcuate second chassis member, a third wheel assembly, and a fourth wheel assembly;
   wherein the first wheel assembly, the second wheel assembly, the third wheel assembly, and the fourth wheel assembly each riding in the track; and
   a tilt plate operatively connected to the first and second bogies and movable therewith.

2. The assembly of claim 1 wherein the tilt plate is configured to operatively hold a camera optically centered relative to the ring and a user specified plane.

3. The assembly of claim 1 further comprising position sensors and a controller configured to receive information from the sensors and to cause stabilization action of the tilt plate to occur in response to the information.

4. The assembly of claim 3 further comprising a roll motor connected to one of the bogies and a tilt motor connected to the tilt plate, and the controller controlling operation of the roll motor and the tilt motor.

5. The assembly of claim 4 wherein the ring, the bogies and the tilt plate define a gimbal assembly to stabilize a camera held by the assembly as the assembly moves in roll and pitch directions.

6. The assembly of claim 5 wherein the gimbal assembly stabilizes the camera in the yaw direction.

7. An assembly comprising:
   a track;
   a first bogie having an arcuate first chassis member, a first wheel assembly, and a second wheel assembly, wherein the first wheel assembly and the second wheel assembly each comprise one or more wheels and the one or more wheels ride on an inside of the track and are offset inwards from the track; and
   a second bogie having an arcuate second chassis member, a third wheel assembly, and a fourth wheel assembly, wherein the third wheel assembly and the fourth wheel assembly each comprise one or more wheels and the one or more wheels ride on the inside of the track and are offset inwards from the track;
   wherein the first bogie and the second bogie travel about a roll axis relative to the track.

8. The assembly of claim 7 further comprising:
   a first motor mounted on an inner surface of the arcuate first chassis member;

a tilt plate connected to the first bogie and the second bogie via a set of pivot points, wherein the tilt plate travels about a pitch axis relative to the track;
a second motor connected to the tilt plate; and
a camera connected to the tilt plate;
wherein the first motor adjusts movement of the camera about the roll axis relative to the track, and the second motor adjusts movement of the camera about a pitch axis relative to the track.

9. The assembly of claim 8 further comprising:
a third motor connected to the assembly, wherein the third motor adjusts movement of the camera about a yaw axis relative to the track.

10. The assembly of claim 8 wherein the center of mass is coincident with an optical axis of the camera within a relative plane of movement.

11. The assembly of claim 8 wherein the track is inwardly disposed on a ring.

12. The assembly of claim 8 wherein the track is tapered.

13. The assembly of claim 8 wherein the first bogie and the second bogie each span about one quarter of the circumference of the track.

14. The assembly of claim 8 further comprising:
a slip ring, wherein the slip ring provides power between a battery and at least one of: the first motor, the second motor, and the camera.

* * * * *